UNITED STATES PATENT OFFICE.

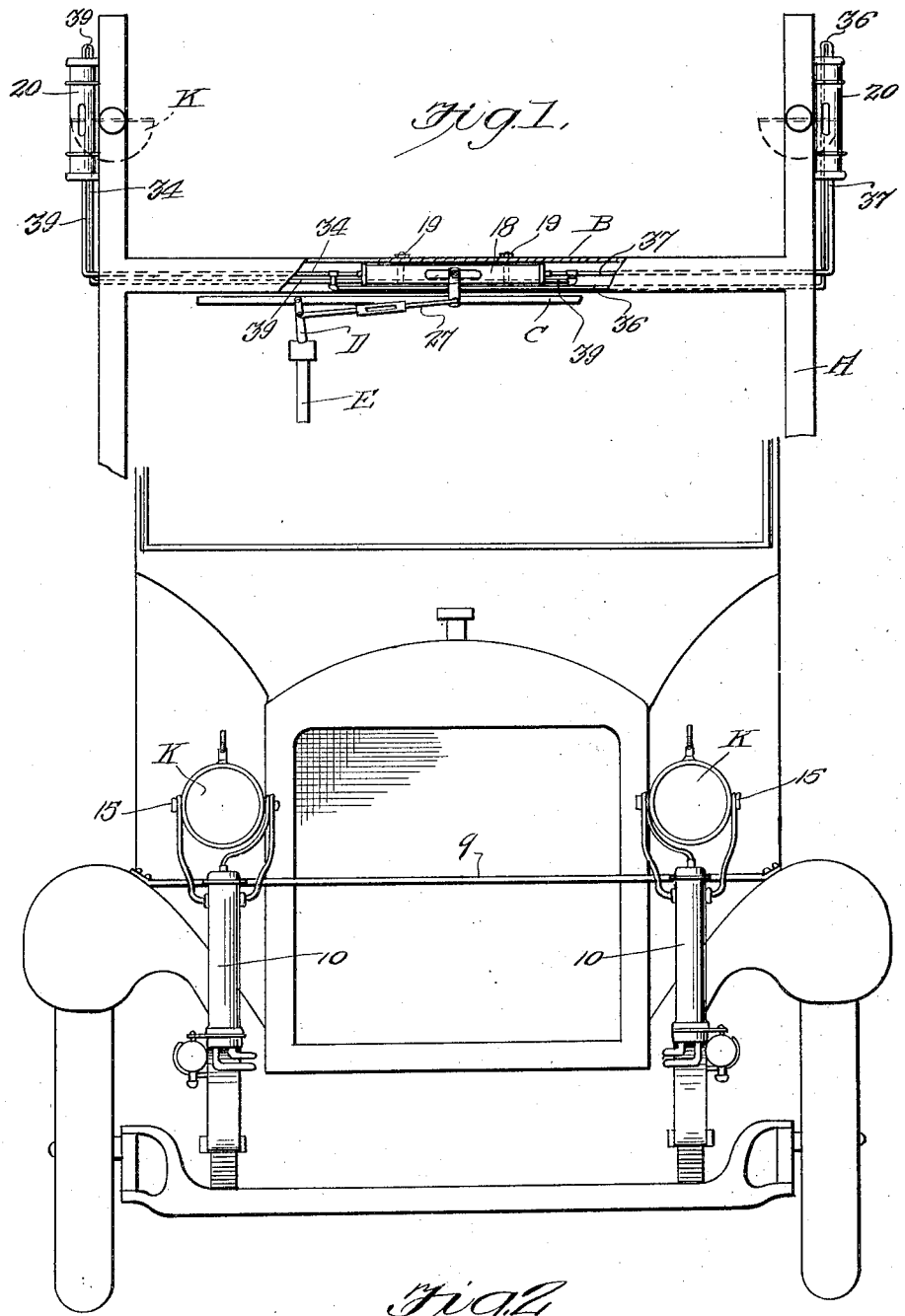

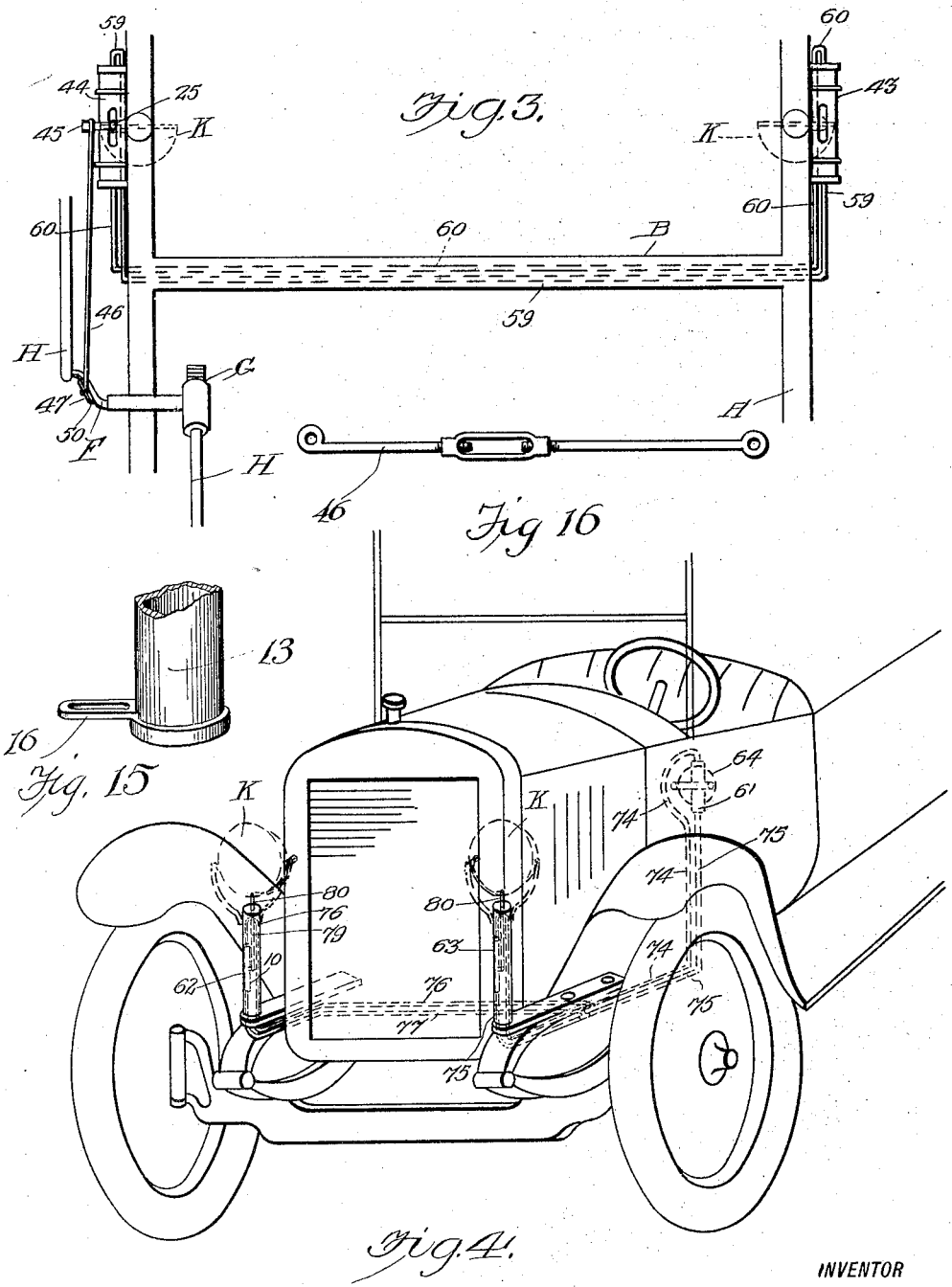

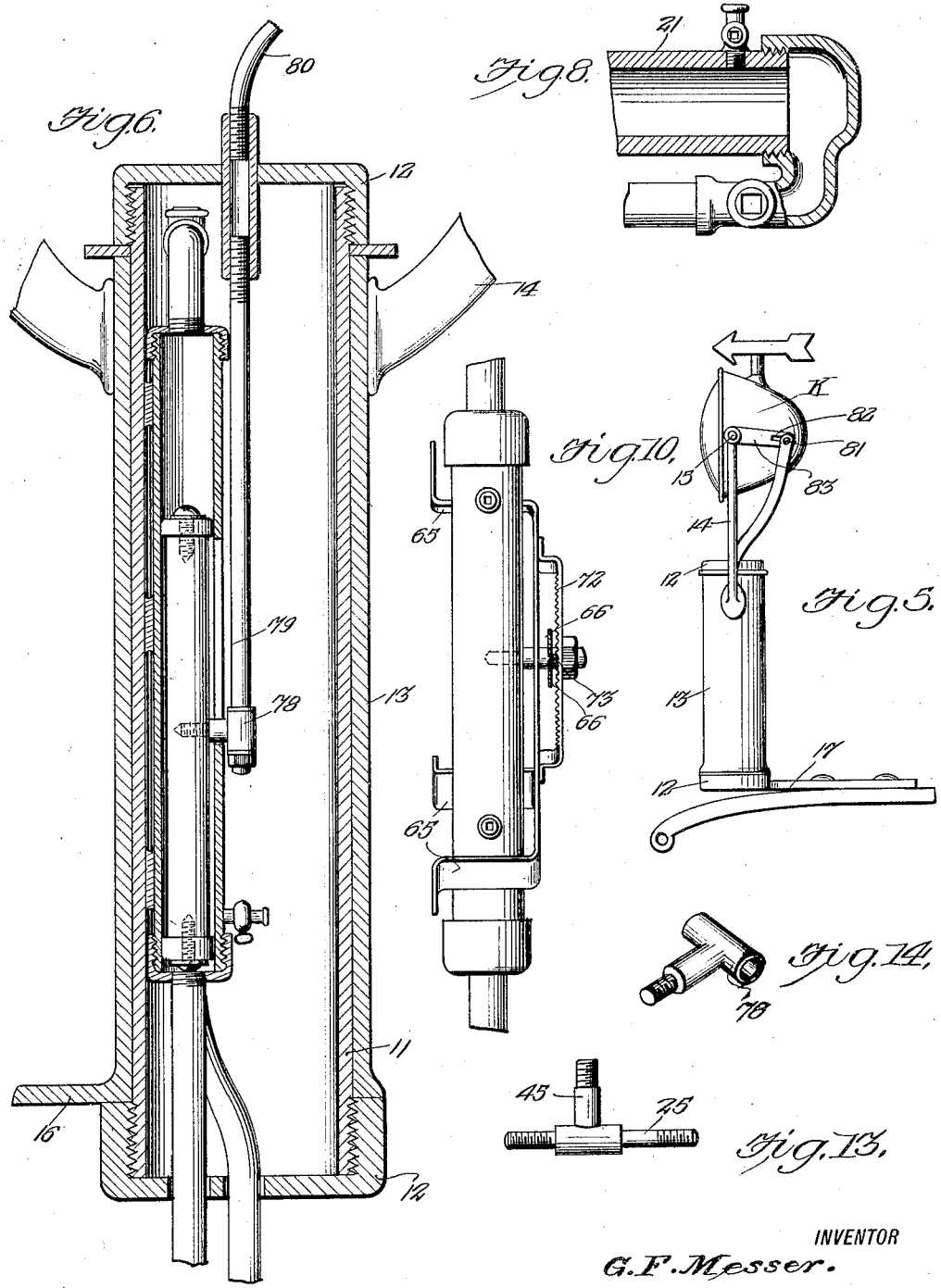

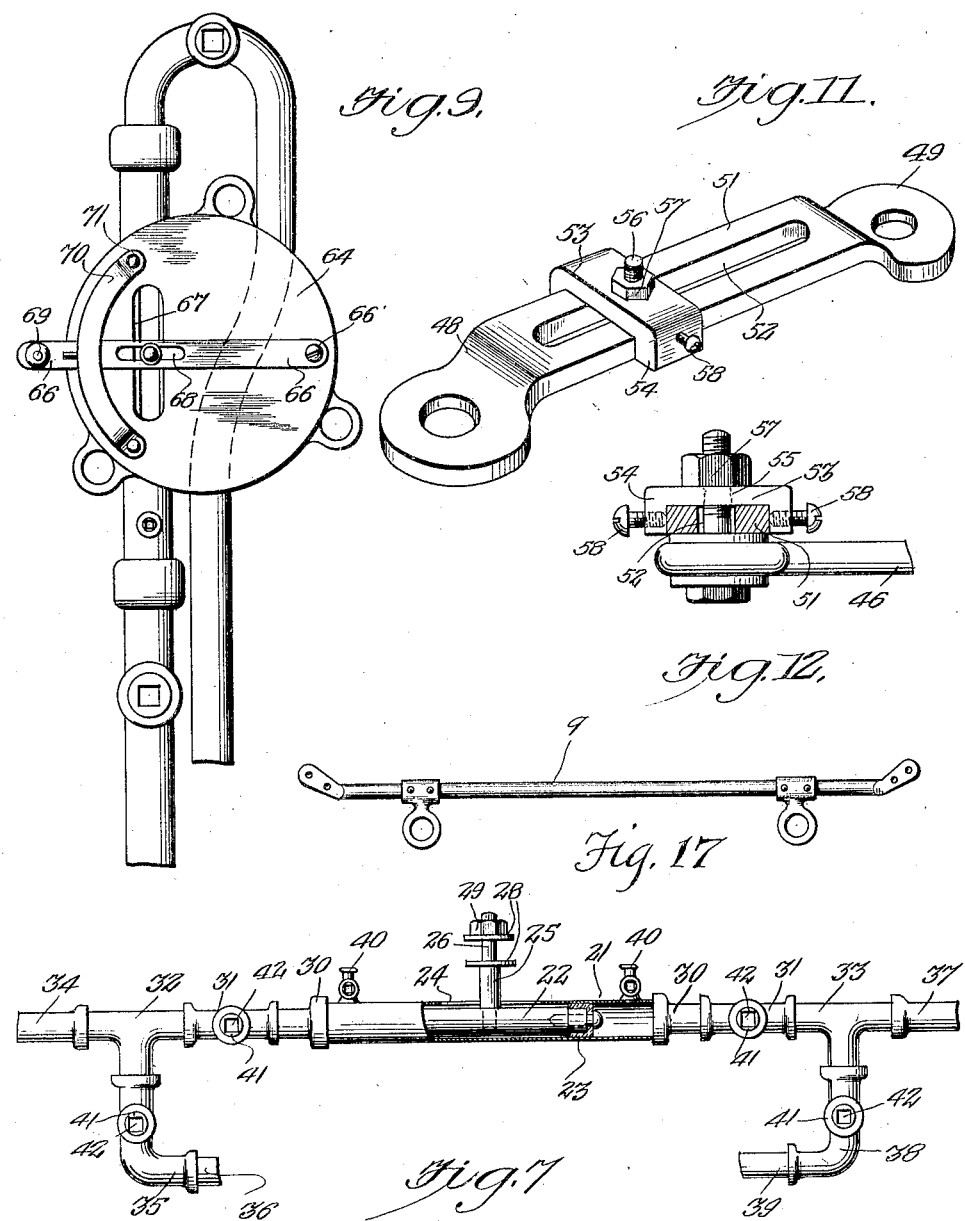

GEORGE FREDERICK MESSER, OF ABERDEEN, WASHINGTON.

DIRIGIBLE HEADLIGHT.

1,386,014.  Specification of Letters Patent.  Patented Aug. 2, 1921.

Application filed June 10, 1920. Serial No. 387,960.

*To all whom it may concern:*

Be it known that I, GEORGE FREDERICK MESSER, a citizen of the United States, and a resident of Aberdeen, in the county of Grays Harbor and State of Washington, have invented certain new and useful Improvements in Dirigible Headlights, of which the following is a specification.

My invention relates to dirigible headlights for vehicles.

The object of my invention is to provide a dirigible headlight which will automatically swing the lights horizontally with the front wheels of the vehicle to maintain the light beams parallel to the plane of the front wheels and which may be manually operated to swing the lights vertically.

Another object is to provide a dirigible headlight of this character which is adapted to be associated with the various types of motor vehicles.

Another object is to provide a dirigible headlight of simple and durable construction, reliable in operation and easy and inexpensive to manufacture.

Other objects and advantages reside in certain novel features of construction, combination and arrangement of parts which will be hereinafter more fully described and particularly pointed out in the appended claims, reference being had to the accompanying drawings, in which:

Figure 1 is a plan view of an embodiment of my invention adapted for use with light automobiles or similar motor vehicles;

Fig. 2 is a front elevational view thereof;

Fig. 3 is a plan view of an embodiment of my invention adapted for use with heavy automobiles, trucks or the like;

Fig. 4 is a perspective view illustrating the system of manually swinging the lights;

Fig. 5 is a side elevational view of the light;

Fig. 6 is a vertical sectional view of the headlight support;

Fig. 7 is a plan view, partly in section, of the pulsator;

Fig. 8 is a detail sectional view of a modified form thereof;

Fig. 9 is a front elevational view of the manually operated pulsator;

Fig. 10 is a side elevation thereof;

Fig. 11 is a detail perspective view of the adjustable connection of the pulsator pitman to the supporting arm;

Fig. 12 is a sectional view thereof;

Fig. 13 is a detail view of the combined wrist pin of the pulsator of the form of my invention shown in Fig. 3;

Fig. 14 is a detail perspective view of the wrist pin for the vertical motors.

Fig. 15 is a fragmentary detail perspective view of the sleeve and crank arm of the light support;

Fig. 16 is a detail view in elevation of the pitman adapted for the embodiment of the invention to be used with heavy trucks and the like; and Fig. 17 is a detail view in elevation of the brace rod.

Referring to the drawings it will be seen that my invention contemplates a vehicle, such as an automobile, which includes a chassis A having a front cross bar B.

The automobile as shown in Fig. 1 is a light car having a steering gear which includes a tie-bar C and a drag link D which is actuated by the steering post E.

The automobile shown in Fig. 3 is of heavy construction and the steering gear therefor embodies a steering arm F which is actuated by a worm and gear G from the steering post H. The steering arm F actuates and controls the front steering wheels of the vehicle through the drag link H.

In both types of automobiles the headlights K are arranged at the front of the vehicle in the usual manner. Each of the headlights is carried upon a suitable support designated generally at 10 and reinforced by a brace rod 9 (see Figs. 2 and 17). As shown in Fig. 6 this support comprises a cylindrical housing 11 which has its ends open and externally threaded. Caps 12 having internal threads are adapted to close the ends of the cylindrical housing 11. Rotatably mounted on the exterior of the housing between the caps 12 is a sleeve 13. Bracket arms 14 are carried by the upper end of the sleeve and the upper ends of the arms are formed to constitute bearings to receive the trunnions 15 which are carried by the headlights K. The lower end of the sleeve is provided with a crank arm 16 to which motion is imparted to turn the sleeve and consequently the headlights to constrain the headlights to a motion of any horizontal motion partaken of by the front wheels of the vehicle. The support 10 is mounted upon the vehicle structure in any suitable manner as by means of a bracket arm 17.

The means for constraining the headlights K to horizontal motion corresponding to the horizontal or steering motion of the front wheels of the vehicle in the form of my invention shown in Fig. 1, includes a pulsator, indicated generally at 18, and preferably secured to the front cross bar B of the chassis by suitable clamps 19. The pulsator 18 controls and actuates the motors 20, of which there is provided one for each headlight.

The pulsators and the motors are identical in construction and are the same in all forms of the invention. As shown in detail in Fig. 7, each includes a cylinder 21 in which is operatively mounted a double acting piston 22. Suitable packing means 23 is provided for each end of the piston, it being understood that each end of the piston constitutes a head thereof. The piston is of a length equal substantially to two-thirds of the length of the cylinder. The cylinder is provided with a slot 24 extending longitudinally thereof for approximately one-third of its length, the slot being arranged centrally of the cylinder. A wrist pin 25 is secured to the piston 22 at its center and projects radially therefrom and extends through the slot 24.

In the form of my invention shown in Fig. 1, the outer end of the wrist pin is reduced, as indicated at 26. The reduced end of the wrist pin of the pulsator is connected to the pitman 27 which operatively connects the wrist pin to the drag link D of the steering gear. The reduced ends of the wrist pins of the motors are each connected to the crank arm 16 of the sleeve so that the motion of the piston of the motors is transmitted to the respective headlight. Suitable fastening means are provided for securing the wrist pin to the pitman or crank arm, and this fastening means preferably consists of spaced fiber washers 28 which embrace the end of the pitman or crank arm which fits over the reduced end of the wrist pin.

The pulsator and the motors are connected by suitable conduits or pipes, one end of each of the motors being connected to one end of the pulsator and the opposite end of the motor is connected to the opposite end of the pulsator so that the double acting piston of the pulsator induces a movement of the motor piston by exerting a positive pressure on one side of the piston of the motor and a negative pressure on the opposite side thereof. For this purpose each end of the cylinder 21 of the pulsator is provided with a hollow cap 30. A valve connection 31 is interposed between this hollow cap 30 and the T-couplings 32 and 33, the T-coupling 32 being disposed on the left-hand side and the T-coupling 33 on the right-hand side of the pulsator and of the machine. A pipe 34 connects the branch of the T-coupling 32 alined with the cylinder to the adjacent end of the motor lying on the left-hand side of the pulsator. The right angle branch of the T-coupling 32 is connected by a valved elbow 35 and a pipe 36 to the far end of the motor cylinder lying on the right-hand side of the pulsator. The branch of the T-coupling 33 alined with the cylinder of the pulsator is connected by a pipe 37 to the adjacent end of the cylinder of the motor lying on the right-hand of the pulsator. The right angle branch of the T-coupling 33 is connected by a valve elbow 38 and a pipe 39 to the far end of the cylinder of the motor lying on the left-hand side of the pulsator. Each end of the cylinder of the pulsator of the motor is provided with pet-cocks 40 and the valve connections 31 and valve elbows 38 are provided with valves 41 having square sockets 42 therein for receiving the tool to operate the valve.

The cylinders and the pipes are all filled with a suitable fluid which is preferably a liquid consisting of a mixture of clear, light and thin, high grade paraffin oil and denatured alcohol. Under the influence of the piston and of the system generally these fluids form a sort of emulsion which lubricates the mechanism and which will not freeze in cold weather.

It will be seen by reference to Figs. 1 and 7 that as the piston of the pulsator is actuated from the steering gear as the course of the vehicle is changed, the motion imparted to the fluid from the pulsator will exert a suction on the adjacent end of the piston of one of the motors and a pressure on the adjacent end of the piston of the other of the motors, a pressure on the opposite end of the first-named piston and a suction on the opposite end of the second-named piston.

In the adaptation of my invention to heavy automobiles, motor trucks and the like, as shown in Fig. 3, the automatic means for constraining the headlights to motion corresponding to the steering motion imparted to the front wheels of the vehicle includes a motor cylinder 43 arranged on one side of the vehicle adjacent the headlight thereof and preferably the right-hand side and a combined motor and pulsator 44 arranged on the left-hand side of the vehicle. The motor 43 and the combined motor and pulsator 44 are identical in construction with the motor and pulsator of the form of my invention hereinabove described and illustrated in Fig. 7, except that the wrist pin of the combined motor and pulsator is provided with a lateral arm 45, as shown in detail in Fig. 14. This lateral arm of the wrist pin is connected to one end of the pitman 46 which is secured at its opposite end to the steering arm F of the steering gear by an adjustable connection indicated generally at 47.

This adjustable connection as shown in detail in Figs. 11 and 12 comprises a strap 48 having apertured ears 49 formed at each end thereof and secured by fastening means 50 to the arm F. The body 5 of the strap is offset, and is provided with an elongated slot 52. A block 53 is slidably arranged on the strap and has depending lugs 54 engaging the side of the strap to guide the block in its motion. The block is provided with a central aperture 55 which is alined with the slot 52 of the strap. A bolt 56 extends through the apertures of the block through the plate and also through an aperture formed in the end of the pitman 46. The head of the bolt through suitable washers engages the pitman and the opposite end of the bolt receives a nut 57 which abuts against the block to secure the pitman. As the block is adjusted along the strap it varies the throw of the pitman thus varying the motion transmitted through the pitman of the pulsator. In order to clamp the block in adjusted position set screws 58 operate through each of the legs 54 and against the corresponding side of the strap. It is to be noted that the offset of the body portion of the strap permits of the insertion of the head of the bolt and of the end of the pitman between the strap and the steering arm.

In this form of the invention the outer end of the combined pulsator and cylinder 44 is connected by a pipe 59 to the inner end of the motor 43 and the inner end of the combined motor and pulsator 44 is connected to the outer end of the motor 43 by a pipe 60 so that corresponding motion may be imparted to the headlights.

Manually controlled means for imparting vertical motion to the headlights is provided. This means, as shown in Fig. 4, embodies a pulsator 61 mounted on the dash of the automobile within convenient reach of the operator viz., in front and at position on top of door, in cowl of machine and motors 62 and 63 which are each arranged within the cylinder housing of the light support on the left and right-hand sides of the vehicle, respectively. The pulsator and the motors are identical with the pulsators and motors herein above described and illustrated in detail in Fig. 7.

The pulsator 61 is however manually operated. This manual operating means (see Figs. 9 and 10) comprises a circular plate 64 carried by a bracket 65 adapted to be secured to the dash or other supporting structure of the vehicle. An operating lever 66 is fulcrumed at 66' to the plate 64. The wrist pin of the pulsator 61 extends through the slot 67 formed in the plate 64 and has its reduced end received in the slot 68 formed in the operating lever. The outer end of the operating lever is provided with an operating knob 69. A segment 70 overlies the operating lever, and has its ends offset and secured, as at 71, to the plate 64. As shown in Fig. 10, the under surface of the segment 70 is notched or serrated, as indicated at 72, and coöperates with a detent 73 preferably integrally formed with the operating lever 66. The operating lever is preferably constructed of spring metal and is normally under slight tension so as to engage the detent in engagement with the notches 72 and thus retain the operating lever in adjusted position. It is obvious that the lever 66 may be grasped by the knob 69 and swung about its pivot 67 and that its motion will be imparted to the piston of the pulsator through the pin and slot connection afforded by the wrist pin of the piston and the slot 68 of the operating lever.

The upper end of the pulsator 61 is connected by a pipe 74 to the upper end of the motor 63 and the lower end of the pulsator is connected to the lower end of the motor 63 by a pipe 75. A branch pipe 76 leads from the pipes 74 to the upper end of the cylinder 62 and a branch pipe 77 leads from the pipe 75 to the lower end of the cylinder 62.

The wrist pin of the motor 62 and 63 is provided with a longitudinally extending sleeve 78, as illustrated in detail in Fig. 14. This sleeve receives and secures the end of a vertical pitman 79 which has its upper end offset, as at 80. The outer end of the offset carries a pin 81 slidably received in the slot 82 provided in the rearwardly and horizontally extending arm 83 carried by the lamp. In this manner the motion of the piston of the motors is communicated or transmitted to the lamp to swing the same vertically, the degree of this motion being determined by the amount of swing imparted by the operator to the lever 66 as the motion of the piston of the pulsator is communicated through the fluid to the piston of the motors and from the motors to the headlights as described.

I claim:

1. In a device of the character described, the combination with a vehicle having a steering gear and steering wheels and a headlight associated with the vehicle, of a support for said headlights including a hollow cylindrical housing, caps at each end of said housing, a sleeve rotatably mounted on said housing between said caps and bracket arms mounted upon the upper end of said housing and carrying said headlight, means for automatically swinging the headlight horizontally corresponding to the horizontal swing of the steering wheels including a pulsator, means for actuating the pulsator from the steering gear, a motor driven from the pulsator, and motion transmission means operative between the motor and the headlight including a crank positively connected to the said sleeve, and means for swinging the headlight vertically including a pulsator, manually operable means for actuating said last-named pulsator, a motor driven from said last-named pulsator and arranged in the cylindrical housing of said light support, and motion transmission means operable between the last-named motor and the headlight.

2. In a device of the character described, the combination with a vehicle having a steering gear and steering wheels and a headlight associated with the vehicle, of a support for said headlights including a hollow cylindrical housing, caps at each end of said housing, a sleeve rotatably mounted on said housing between said caps and bracket arms mounted upon the upper end of said housing and carrying said headlight, means for automatically swinging the headlight horizontally corresponding to the horizontal swing of the steering wheels including a pulsator, means for actuating the pulsator from the steering gear, a motor driven from the pulsator, and motion transmission means operative between the motor and the headlight including a crank positively connected to the said sleeve.

3. In a device of the character described, the combination with a vehicle having a steering gear and supporting wheels and headlight associated with said vehicle, of a support for said headlight including a hollow cylindrical housing, caps at each end of said housing, a sleeve rotatably mounted on said housing between said caps and bracket arms mounted on the upper end of said housing and carrying said headlight, means for automatically swinging the headlight from the steering means including a motor comprising a cylinder having a longitudinal slot therein, a piston in said cylinder and a pin secured to said piston and projecting through said slot, and motion transmission means between the motor and the headlight including a crank directly connected to the sleeve and pivotally connected to said pin to be actuated thereby, and a pulsator actuated from the steering gear for controlling said motor.

4. In a device of the character described, the combination with a vehicle and a headlight associated with said vehicle, of a support for said headlight including a hollow cylindrical housing, caps at each end of said housing, a sleeve rotatably mounted on said housing between said caps, and bracket arms mounted on the upper end of said housing and carrying said headlight, means for swinging the headlight including a motor comprising a cylinder having a longitudinal slot therein, a piston in said cylinder and a pin secured to said piston and projecting through said slot, motion transmission means between the motor and the headlight including a crank directly connected to the sleeve and pivotally connected to the pin to be actuated thereby, and a pulsator controlling said motor.

GEORGE FREDERICK MESSER.